United States Patent
Roth

(10) Patent No.: US 11,338,330 B2
(45) Date of Patent: May 24, 2022

(54) SYSTEMS AND METHODS OF DISTRIBUTED PRINTING FOR USE WITH AUTOMATED ROBOTIC SORTING

(71) Applicant: AVERY DENNISON RETAIL INFORMATION SERVICES LLC, Mentor, OH (US)

(72) Inventor: Mark Roth, North Miami, FL (US)

(73) Assignee: Avery Dennison Retail Information Services LLC, Mentor, OH (US)

(*) Notice: Subject to any disclaimer, the term of this patent is extended or adjusted under 35 U.S.C. 154(b) by 406 days.

(21) Appl. No.: 16/726,158

(22) Filed: Dec. 23, 2019

(65) Prior Publication Data

US 2020/0197982 A1 Jun. 25, 2020

Related U.S. Application Data

(60) Provisional application No. 62/783,794, filed on Dec. 21, 2018.

(51) Int. Cl.
*B07C 5/36* (2006.01)
*G06F 3/12* (2006.01)
(Continued)

(52) U.S. Cl.
CPC .............. *B07C 5/36* (2013.01); *G06F 3/1203* (2013.01); *G06F 3/1231* (2013.01);
(Continued)

(58) Field of Classification Search
CPC ....... B07C 5/36; G06F 3/1203; G06F 3/1231; G06F 3/1263; G06F 13/37; G06F 13/382; G06F 2213/0042
(Continued)

(56) References Cited

U.S. PATENT DOCUMENTS 11,185,891 B2 * 11/2021 Cousins ............... G06K 7/1447
2009/0164668 A1   6/2009 Duckett
(Continued)

FOREIGN PATENT DOCUMENTS

WO    2002/000362    1/2002

OTHER PUBLICATIONS

International Preliminary Report on Patentability dated Jun. 16, 2021 issued in corresponding IA No. PCT/US2019/068439 filed Dec. 23, 2019.

(Continued)

*Primary Examiner* — Douglas Q Tran
(74) *Attorney, Agent, or Firm* — Avery Dennison Retail Information Services LLC

(57) ABSTRACT

A system of distributed printing for use with automated robotic sorting has at least one work cell including a robotic sorting station, and a plurality of locations that receive sorted items from the robotic sorting station, with each of the plurality of locations having a separate printer. Each printer is configured to print labels related to items received by the respective location, wherein the printers in the work cell are configured in a network that receives data relating to the labels to be printed in the respective locations. Also included is a method of using the system and operating the automated robotic sorting station to place items in the plurality of locations, and sending data to the work cell relating to the labels to be printed in the respective plurality of locations by the separate printers and in association with the items received by the respective plurality of locations.

20 Claims, 2 Drawing Sheets

(51) Int. Cl.
*G06F 13/37* (2006.01)
*G06F 13/38* (2006.01)

(52) U.S. Cl.
CPC ............ *G06F 3/1263* (2013.01); *G06F 13/37* (2013.01); *G06F 13/382* (2013.01); *G06F 2213/0042* (2013.01)

(58) Field of Classification Search
USPC .............................. 358/1.15, 1.14, 1.13, 1.1
See application file for complete search history.

(56) References Cited

U.S. PATENT DOCUMENTS

| | | |
|---|---|---|
| 2017/0251079 A1 | 8/2017 | Duckett et al. |
| 2018/0154399 A1 | 6/2018 | Wagner et al. |
| 2020/0055094 A1* | 2/2020 | de Bruijn .............. B07C 5/3412 |
| 2020/0311669 A1* | 10/2020 | Rajkhowa .......... G06Q 10/0832 |

OTHER PUBLICATIONS

International Search Report and Written Opinion dated Mar. 18, 2020 issued in corresponding IA No. PCT/US2019/063439 filed Dec. 23, 2019.

* cited by examiner

SYSTEMS AND METHODS OF DISTRIBUTED PRINTING FOR USE WITH AUTOMATED ROBOTIC SORTING

CROSS REFERENCE TO RELATED APPLICATION(S)

The present application claims priority to and the benefit of U.S. provisional utility patent application Ser. No. 62/783,794 filed Dec. 18, 2018, which is incorporated herein by reference in its entirety.

BACKGROUND

Field of the Disclosure

The present subject matter relates to label printing operations in association with sorting and packing of items intended for shipment. More particularly, the present subject matter relates to systems and methods of distributed printing for use with automated robotic sorting.

Description of Related Art

Sortation of items and the subsequent packing of those items for shipment has traditionally been accomplish by manual means. This has included tasking individual employees with inspecting and deciding which items to select for shipment, as well as completing the physical movements to place items in cartons or boxes.

Robots are now being employed to handle the sorting task. Sortation using robots is accomplished with a complex configuration of camera systems and other scanning systems. However, what to do with an item after the sorting determination has been made is still moving in the direction of establishing appropriate background logic or instructions that tell the robot where to place the item.

In some environments, items are placed into a specific bin among an array of bins. For efficiency, the bins are arranged in a work cell surrounding the robot that is performing the sortation. The bins may include alerts, such as lights, audible alarms or some other means to signal that a particular bin is full and/or ready to move forward with the packing process. The bin then is emptied and the items are placed into cartons to initiate the packing process.

In addition to loading cartons, another aspect of the packing process for the sorted items is to print labels. Shipping and/or carton content labels are typically printed for use in this process. However, the labels themselves may only come from a centralized printing location, which may or may not be near the robotic cell and bins. While conventional thinking is that centralized printing is efficient due to high utilization of a single printer, the reality is that centralized printing that is remote from the bins is not efficient and has significant potential for encountering errors.

Having printed labels for various bins in a work cell originate from a central printing location creates a process of mix and match that must be applied by a worker. The worker must use potential visual clues to match a label with a proper bin location. As will be appreciated by even a casual observer, this system of matching labels from the central printer to remotely located bins may work much of the time, but it is inefficient and has potential for errors, especially by a non-attentive operator. Moreover, the errors can be quite costly because they may result in the wrong list of contents being inserted in a package, or result in shipping to the wrong addressee (individual, company or other party).

SUMMARY

The present disclosure is directed to systems and methods of distributed printing that improves the efficiency in an automated robotic sorting and packing process that requires printed labels. There are several aspects of the present subject matter, which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

Systems and methods according to the present disclosure eliminate the time wasted by individuals having to apply the error-prone mix and match method of dispersing labels from a centralized printer to remote bin locations. The inventive systems and methods employ a distributed printing solution. Instead of one central printer, small printers are placed in conjunction with each location, such as a bin, that receives sorted items. This eliminates the mix and match process prone to error as the labels are printed immediately adjacent the location containing items associated with the respective labels. No time is wasted walking around the work cell or broader production floor trying to find the appropriate matching location for a group of labels dispensed from the central printer.

In a first aspect, the disclosure provides a system of distributed printing for use with automated robotic sorting that includes at least one work cell including a robotic sorting station, a plurality of locations that receive sorted items from the robotic sorting station, with each of the plurality of locations having a separate printer. Each respective printer is configured to print labels that are related to items received by the respective location, and the printers in the work cell are configured in a network that receives data relating to the labels to be printed in the plurality of locations.

In a second aspect, the disclosure provides a method of distributed printing for use with automated robotic sorting, including of providing at least one work cell including a robotic sorting station, and providing a plurality of locations that receive sorted items from the robotic sorting station, with each of the plurality of locations having a separate printer and each respective printer being configured to print labels that are related to items received by the respective location, and wherein the printers in the at least one work cell are configured in a network that receives data relating to the labels to be printed in the respective locations. The method further includes operating the automated robotic sorting station to place items in the plurality of locations, and sending data to the at least one work cell relating to the labels to be printed in the respective plurality of locations by the separate printers and in association with the items received by the respective plurality of locations.

The invention also uses a unique communications method which transmits data more efficiently, and requires only one Internet Protocol (IP) address for a work cell that may have a plurality of printers associated with a corresponding plurality of locations.

DESCRIPTION OF THE ILLUSTRATED EMBODIMENTS

It is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
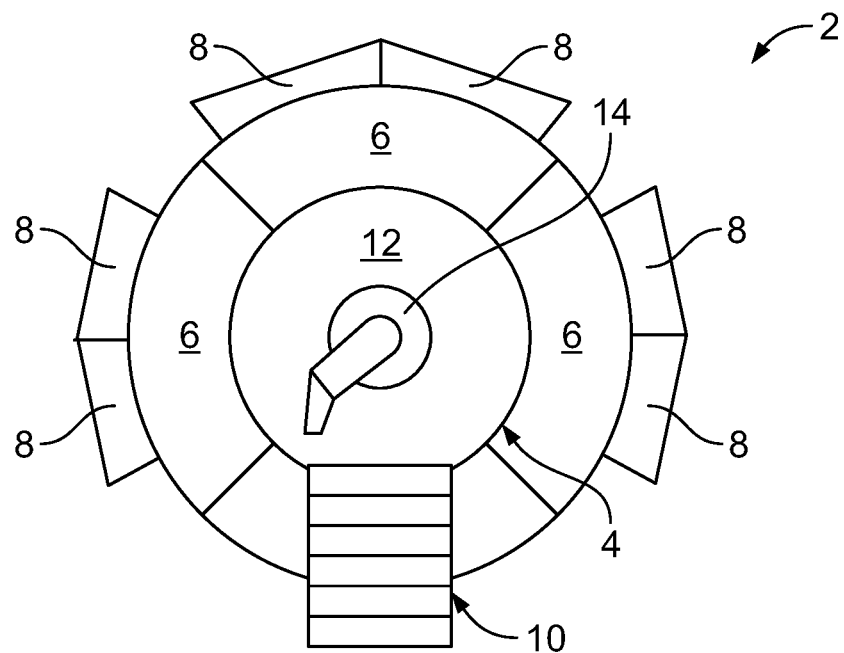
FIG. 1 is a simplified schematic diagram showing a work cell having a robotic sorting station.

FIG. 1 provides a simplified schematic diagram showing a work cell 2 having a robotic sorting station 4 positioned among a plurality of locations 6, such as bins that receive sorted items and are associated with packing stations 8. For example, the robotic sorting station 4 may include an in feed belt 10 which brings items to a collection basin 12 associated with a robot 14. The robot 14 may reach into the collection basin 12, pick up a random item, rotate and move the item to a zone where it can be analyzed to determine the identity of the item and the location of a bin 6 where the item needs to be placed. The robot 14 may utilize common technology for sorting purposes, such as cameras, scanners or other suitable equipment.

The robotic sorting station 4 is to be located in association with a work cell 2 that includes an array of locations 6, which will be referred to hereinafter as bins, although it will be appreciated that suitable alternative structures may be used to receive items sorted by the robot 14. For convenience, this arrangement is shown in a simplified schematic diagram as having the collection basin 12 and robot 14 located adjacent a plurality of bins 6 and a corresponding plurality of packing stations 8, which may include tables, benches or other furnishings to permit completion of the packing process. The bins 6 may include alerts, such as lights, audible alarms or some other means to signal that a particular bin is full and/or ready to move forward with the packing process. The particular bin 6 then is emptied and the items are placed into cartons or other suitable containers in the packing stations 8 to initiate the packing process. Thus, the bins 6 that have been filled may be emptied or otherwise manipulated to remove the contents and place them in one or more cartons or other containers in the respective packing stations 8 for final processing for shipment.

Figure 2:
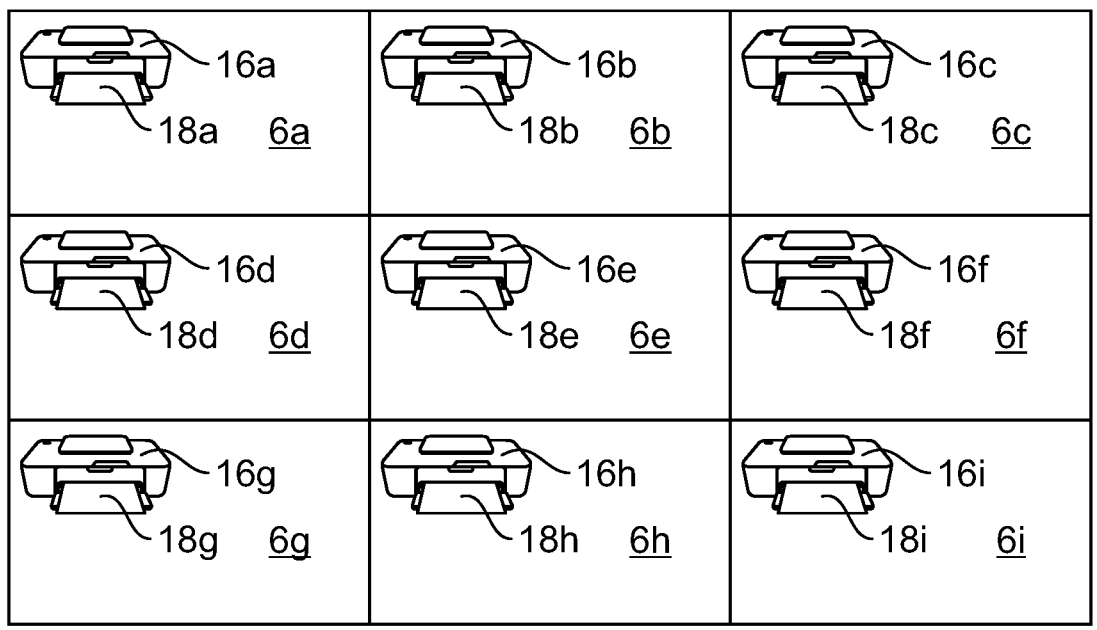
FIG. 2 is a simplified schematic diagram of a portion of a work cell showing an array of locations that receive sorted items, with each location having a separate printer.

It will be appreciated that the bins may be arranged in an array that is configured to be serviced by the robot. With respect to arrays of locations or bins 6, FIG. 2 provides a simplified schematic diagram of a portion of a work cell 2 that includes a three-by-three array of bins, which are individually identified as 6a-6i and collectively identified as 6. Each bin 6 is shown as including a respective printer, which are individually identified as 16a-16i and collectively identified as 16. It will be appreciated that the locations or bins 6 may be arranged in various formats or arrays that accommodate the capabilities and operation of the particular sortation robot being utilized. For example, the bins 6 may be arranged in an array, such as the three-by-three array shown in FIG. 2, which includes bins 6a-6i. FIG. 2 shows an example of how the printers 16a-16i may be positioned within the bins to be functionally efficient.

The invention eliminates the wasted time and error-prone nature of the current method of having individuals mix and match centrally printed labels with remote work cells and individual bins by instead employing a distributed printing solution. Contrary to having one central printer, individual, relatively smaller printers 16 are placed in conjunction with each of the respective bins 6 and the printers 16a-16i are configured to print labels 18a-18i that correspond or are otherwise related to items received by the respective printers 16a-16i. For example, printers 16a-16i are individually placed within or immediately adjacent to corresponding bins 6a-6i. This decentralized, distributed printing solution eliminates the mix and match process prone to error as respective labels 18a-18i are printed immediately adjacent the corresponding bins 6a-6i containing items associated with the respective labels 18a-18i. No time is wasted walking around the work cell or broader production floor trying to find the appropriate matching bin for a group of labels that with prior art methods would be dispensed from a central printer.

Figure 3:
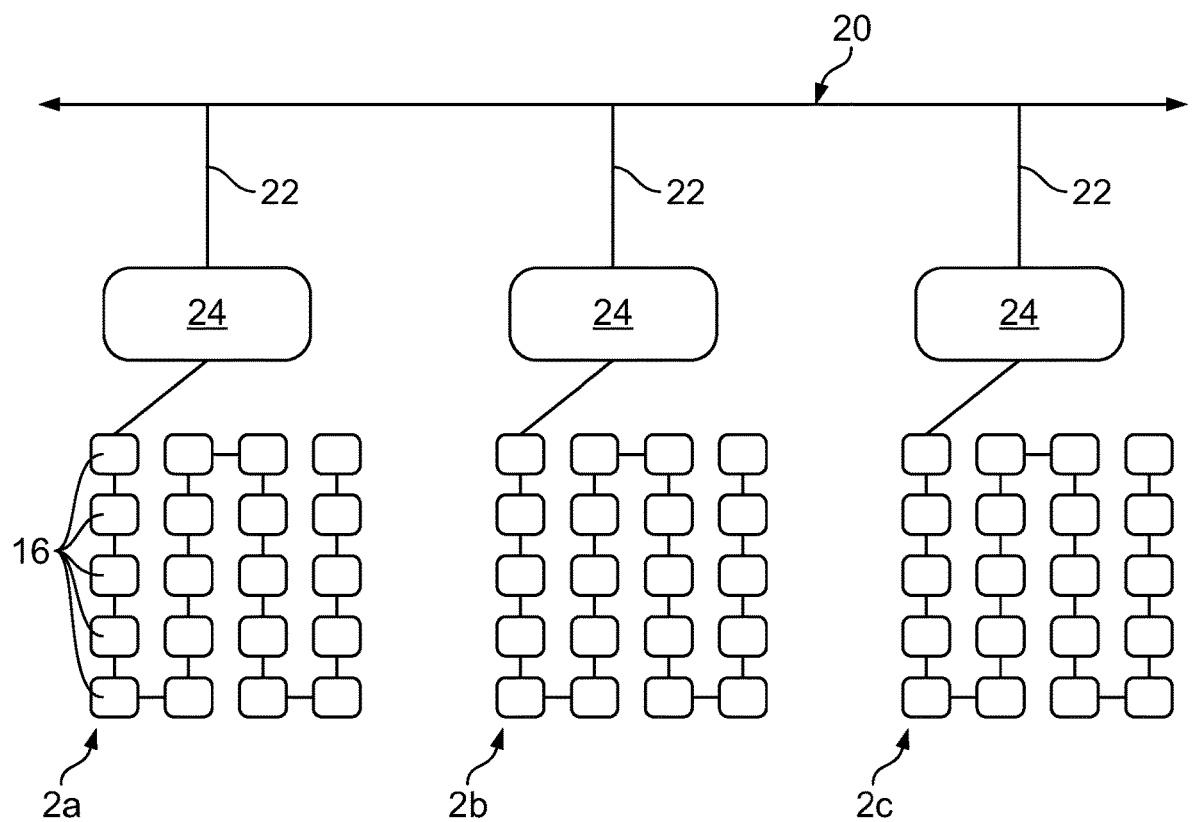
FIG. 3 is a simplified schematic diagram showing a communication network and portions of three example linked work cells, with each work cell having twenty associated printers.

The invention also uses a unique communications system and method illustrated in a simplified schematic diagram in FIG. 3. For ease of viewing, FIG. 3 focuses on the communication network associated with the printers in three respective work cells, wherein it will be appreciated that the plurality of printers 16 are located in a corresponding plurality of separate locations or bins, such as areas shown in the example in FIG. 2, and wherein the work cells also would be associated with a sortation robot, such as is shown in the example in FIG. 1. Thus, FIG. 3 provides a simplified schematic diagram including portions of work cells to focus on how data is communicated and moves across or among the respective printers in the work cells. In the example shown in FIG. 3, twenty printers 16 are linked and would be located, for example, in twenty respective corresponding locations or bins within each of three respective work cells 2a-2c, although it will be appreciated that the work cells may include fewer or more locations having separate printers. It is also within the scope of the present disclosure for different work cells to have different numbers of locations or bins and, thus, different numbers of printers and/or for the locations or bins within an individual work cell to have different numbers of printers.

For explanation purposes, focusing on the portion of the work cell 2a, the data needed for printing the labels for each bin of the respective plurality of bins may be transmitted to the series of printers 16 via an Ethernet backbone 20 and respective Ethernet cables 22. The data for a specific work cell is sent to a single IP address associated with a network adapter 24 for USB/serial communication within the respective work cell. From the adapter 24 associated with the single IP address, the data for printing labels is passed as a message packet from one printer 16 to the next respective printer 16 in the respective work cell 2a until the data message packet is recognized by the intended printer 16 as a data message packet for the intended printer. This may be accomplished via a USB or other suitable peer to peer connection, instead of loading the Ethernet backbone 20. In this example, the work cell 10a would have twenty bins for the twenty printers 16. The significance of the unique communications method is that, if there is a work cell with twenty bin locations and twenty associated printers, only one IP address need be allocated by the Information Technology (IT) System Administrator. Advantageously, only one IP address needs to be released from a scarce pool of a limited number of IP addresses. This allows for administration of only one IP address per work cell, as opposed to requiring twenty IP addresses.

There is not a high speed data requirement nor is the data packet that is being sent to a printer very large, so printer data packets can be passed from printer to printer in a daisy chain fashion, or very quickly from a central communications controller to the lead printer in the chain via a single communications cable. The header structure in the data packet may be recognized by a printer of the plurality of printers in a given work cell and simply ignored if it is not intended for that specific printer.

Although not exclusive to this process, it is envisioned that printing of shipping labels as well as carton content labels would be a standard label printing practice. The carton content label allows an associate who is responsible for proper packing to have a means to visibly review items and possibly perform a quick quality assurance task. The carton content label then may be placed inside the carton with the items before the carton is sealed. Once the carton is sealed, the shipping label is applied to the exterior of the carton to ready the carton for further routing, transportation and eventual shipment.

It will be understood that the embodiments described above are illustrative of some of the applications of the principles of the present subject matter. Numerous modifications may be made by those skilled in the art without departing from the spirit and scope of the claimed subject matter, including combinations of features that are individually disclosed or claimed herein. For these reasons, the scope hereof is not limited to the above description but is as set forth in the following claims, and it is understood that claims may be directed to the features hereof, including combinations of features that are individually disclosed or claimed herein.

The invention claimed is:

1. A system of distributed printing for use with automated robotic sorting, comprising:
   at least one work cell including a robotic sorting station; and
   a plurality of locations that receive sorted items from the robotic sorting station, with each of the plurality of locations having a separate printer, wherein
      each respective printer is configured to print labels that are related to items received by the respective location, and
      the printers in the at least one work cell are configured in a network that receives data relating to the labels to be printed in the plurality of locations.

2. The system of claim 1, wherein the robotic sorting station further comprises a robot configured to sort items received by the at least one work cell.

3. The system of claim 2, wherein the robotic sorting station further comprises a collection area for the items received by the robotic sorting station and from which the robot selects items to be sorted.

4. The system of claim 3, wherein the collection area is a collection basin.

5. The system of claim 3, wherein the robotic sorting station further comprises an in feed mechanism that delivers items into the collection area.

6. The system of claim 1, wherein the plurality of locations that receive sorted items further comprise bins.

7. The system of claim 1, wherein the plurality of locations that receive sorted items are disposed adjacent to packaging stations.

8. The system of claim 1, wherein the at least one work cell has a single IP address.

9. The system of claim 8, wherein the data relating to the labels to be printed in the respective locations is transmitted to the single IP address and then circulated to the printers within the at least one work cell to be utilized by the printer corresponding to the data.

10. The system of claim 9, further comprising a plurality of work cells that are connected to an Ethernet backbone by a plurality of respective Ethernet cables.

11. The system of claim 10, further comprising a network adapter for USB/serial communication with all of the printers within a respective work cell.

12. The system of claim 11, wherein the data relating to the labels to be printed in the respective locations is communicated in data packets that are passed from printer to printer in a respective work cell.

13. The system of claim 12, wherein
   each data packet includes a header structure recognized by the plurality of printers in the respective work cell and relating to the labels to be printed in the respective location, and
   the plurality of printers in the respective work cell are configured to act on the respective data packet or to ignore and pass along the respective data packet to the next printer in the respective work cell.

14. A method of distributed printing for use with automated robotic sorting, comprising:
   providing at least one work cell including a robotic sorting station;
   providing a plurality of locations that receive sorted items from the robotic sorting station, with each of the plurality of locations having a separate printer and each respective printer being configured to print labels that are related to items received by the respective location, and wherein the printers in the at least one work cell are configured in a network that receives data relating to the labels to be printed in the respective locations;
   operating the automated robotic sorting station to place items in the plurality of locations;
   sending data to the at least one work cell relating to the labels to be printed in the respective plurality of locations by the separate printers and in association with the items received by the respective plurality of locations.

15. The method of claim 14, wherein said sending data relating to the labels to be printed in the respective locations includes communicating the data to one IP address for the at least one work cell.

16. The method of claim 15, wherein the one IP address is associated with an adapter used to provide USB/serial communication with the plurality of printers in the at least one work cell.

17. The method of claim 15, wherein the data is communicated to the at least one work cell in data packets that are passed from printer to printer within the plurality of printers in the at least one work cell.

18. The method of claim 17, wherein the plurality of printers are linked for communication in a daisy chain network.

19. The method of claim 14, wherein the data is communicated to the at least one work cell in data packets that are passed from printer to printer within the plurality of printers in the at least one work cell.

20. The method of claim 19, wherein
   each data packet includes a header structure recognized by the plurality of printers in the at least one work cell and relating to the labels to be printed in at least one of the respective locations, and each of the plurality of printers is configured to act on the respective data packet or to ignore and pass along the respective data packet to the next printer in the at least one work cell.

* * * * *